United States Patent
Hügenell

Patent Number: 5,157,556
Date of Patent: Oct. 20, 1992

[54] PRIMARY REFLECTOR FOR A REFLECTOR TELESCOPE

[75] Inventor: Hermann Hügenell, Lambesheim, Fed. Rep. of Germany

[73] Assignee: Karl F. Angstenberger, Frankenthal, Fed. Rep. of Germany

[21] Appl. No.: 392,991

[22] PCT Filed: Nov. 17, 1988

[86] PCT No.: PCT/DE88/00726
§ 371 Date: Jul. 18, 1989
§ 102(e) Date: Jul. 18, 1989

[87] PCT Pub. No.: WO89/04980
PCT Pub. Date: Jun. 1, 1989

[30] Foreign Application Priority Data
Nov. 20, 1987 [DE] Fed. Rep. of Germany ....... 3739841

[51] Int. Cl.$^5$ ............................ G02B 5/08; G02B 7/18
[52] U.S. Cl. .................................... 359/849; 359/851; 250/201.1
[58] Field of Search ................. 350/611, 613; 359/846, 359/849, 850, 851; 250/201.1

[56] References Cited
U.S. PATENT DOCUMENTS

| | | | |
|---|---|---|---|
| 4,776,684 | 10/1988 | Schmidt-Kaler | 350/613 |
| 4,822,156 | 4/1989 | Hugenell | 350/613 |
| 4,825,062 | 4/1989 | Rather et al. | 350/611 |
| 4,944,580 | 7/1990 | MacDonald et al. | 350/611 |

OTHER PUBLICATIONS

Morrison; "Development Problems of the Primary Mirror for Large Space Telescopes"; S.P.I.E. Journal; May 1970; vol. 8 pp. 107–118.

Primary Examiner—Bruce Y. Arnold
Assistant Examiner—R. D. Shafer
Attorney, Agent, or Firm—McGlew & Tuttle

[57] ABSTRACT

A main mirror for a reflecting telescope comprises plurality of individual polygonal reflecting elements (1 to 11) and positioning and adjusting elements (12) connected thereto. Prior art main mirrors of this type have a poor capacity for transmitting ponint images and for modulation and are unsuitable for use in the infrared region, because the positioning and adjustment elements, in particular the measurement sensors arranged in the region of the separating lignes between the individual polygonal reflecting elements (1 to 11) emit interfering thermal radiation. Furthermore, the polygonal reflecting elements (1 to 11) of prior art main mirrors (20) are expensive to manufacture. In order to remedy these drawbacks, the reflecting surface forms a complete circle by means of connecting reflecting elements (1 to 8) connected radially to the outer edges of the polygonal reflecting elements (9), the reflecting elements (1 to 11) are made from a lightweight preformed material, and the positioning and adjustment elements (12) are arranged below the reflecting elements (1 to 11).

1 Claim, 3 Drawing Sheets

PRIMARY REFLECTOR FOR A REFLECTOR TELESCOPE

FIELD OF THE INVENTION

The invention relates to a primary reflector for a reflector telescope, comprising a plurality of individual polygonal reflector bodies and positioning and adjusting elements assigned to said reflector bodies the positioning and adjustment elements are arranged below the reflector bodies and the reflector surface of the reflector bodies cooperate to form a full circular surface which is joined radially at inner and outer boarders of various polygonal reflector bodies.

BACKGROUND OF THE INVENTION

A reflector telescope of this kind is known as Mauna Kea reflector telescope with 10 m reflector diameter being still in the planning stage (Sterne und Weltraum, 1984/August-September, p. 412, Appl. Optics, No. 14, 2631-2641).

In this reflector telescope, the primary reflector is formed of 36 hexagonal reflector bodies forming, in a honey-comb structure, the reflector surface, in the center of which a reflector body being omitted for observation purposes in the Cassegrain focus. Manufacture of the individual hexagonal reflector bodies themselves is very problematic. They are off-axis segments of a paraboloid to be cut in hexagon shape (Appl. Optics, vol. 19(1980), No. 14, 2332-2340).

When manufacturing, as part to be fashioned, a circular part is selected to be deformed by accurately defined shearing and bending forces acting on the borders. Into the deformed blank, a spherical shape is ground. Then, the forces exerted are removed. As far as the forces have been selected properly, each reflector body accepts the desired shape of a paraboloid segment of the primary reflector after unloading. It has been found out, however, that faults occur when cutting to hexagonal shape.

Furthermore, depending on the position of the primary reflector of the reflector telescope, on thrusts due to wind and on temperature variations, the positions of the individual very thin-walled hexagonal reflector bodies have to be readjusted. For this purpose, the support points of each reflector segment are connected with three position controllers to refocus the the reflector body and to adjust it in two inclination directions. At the edges of the reflector bodies, sensors are provided measuring the displacements of adjacent reflector bodies with respect to each other. Together with three inclination sensors measuring the total curvature of the reflector body, they provide information to be processed in a computer system controlling the in total 108 position controllers. With a total 168 different sensors, redundancy is large enough that failure of individual sensors can be tolerated. In this arrangement, however, the front sides of the reflector bodies are left free from disturbing monitoring systems. Occasionally, only, a readjustment has to be performed by means of a constellation, such that even infrared observations will be possible by day. Sensors and position controllers must operate with an accuracy of at least 50 nm.

In theoretical investigations of the primary reflector of the reflector telescope described in DE patent 35 38 208, the reflector bodies of which are circular-disk shaped, such that between the individual reflector bodies, free spaces for the support of the reflector bodies and for the supporting bars structure or its shadow areas are formed, it has been found out that the free spaces put into question the infrared suitability of the primary reflector. The metal components in the area of the free spaces of the support structure of the primary reflector transmit thermal radiations to the detector arranged in the focus of the primary reflector and disturb the signal to be received from space.

Infrared suitability of the primary reflector is necessary to detect dark bodies in space, being present as weight, or mass but not visible to the human eye by means of the primary reflector. Theoretically, the phenomenon of own infrared thermal radiation of the free spaces can be excluded by technical counter-measures. They are, however, extremely expensive.

The investigations performed because of the theoretical considerations with respect to the reflector telescope according to DE patent 35 38 208, those investigations questioning the infrared suitability of this primary reflector, led to theoretical investigations of the primary reflector of the Mauna Kea reflector telescope with 10 m reflector diameter. Here, too, disturbing infrared radiations have been discovered, in spite of the basically closed reflector surface. Said infrared radiations could be guided back to the sensors arranged in the area of the contact lines of the adjacent hexagonal reflector bodies, said sensors measuring the displacement of adjacent reflector bodies with respect to each other. The primary reflector of the Mauna Kea reflector telescope has in total 168 displacement sensors, with in total 36 hexagonal reflector bodies. These, too, radiate an appreciable amount of radiation, resulting, again, in disturbing infrared radiation. Thus, the primary reflector according to the state of the art does not possesses the problem that the individual reflector bodies ground under load are only ground in the form of an aspherical off-axis section, but the lack of infrared suitability, due to the absolutely necessary displacement sensors, is also a problem. Finally, the fact that the outer contour of the primary reflector composed of hexagonal reflector bodies is not uniform has resulted in negative effects in the point image as well as in the modulation transmission function.

OBJECTS OF THE INVENTION

It is an object of the invention to provide a primary reflector for a reflector telescope of the above mentioned species in which the primary reflector has a lower total weight and for which a simple and economic manufacture of the individual reflector bodies is possible. According to the invention, a primary reflector for a reflector telescope is provided including a plurality of individual reflector bodies each having a shape and a reflector surface and each being associated with positioning and adjusting elements assigned to each of the reflector bodies. The positioning and adjusting elements are arranged below the reflector bodies. The reflector surface of each of the bodies cooperates with other adjacent bodies such that outer and inner boarders are formed by the cooperating polygonal reflector bodies. Each of the reflector bodies is formed of a honeycomb structure provided with hollow spaces for reducing the weight of the reflector body. The structure is provided as a blank with a shape and surface substantially corresponding to the surface of the finished reflector body wherein each reflector body is individually ground and polished for final processing of the entire reflector surface to provide shape of the overall reflector surface.

The primary reflector according to the invention having a large diameter with a circular outer contour consists of nearly gap-free combined, constructed reflector bodies of various shapes, forming a circular surface, the surfaces of said reflector bodies being suitable to be polished individually or in composite action, such that they can accept the shape of an aspherical off-axis section. Preferably, the primary reflector has a parabolic shape, a differing shape can, however, also be provided, e.g. for a Ritchey-Chrétien reflector telescope. Because of the large total diameter or the large total aperture, resp., of the primary reflector, its individual reflector bodies joined to a central reflector body are off-axis sections of the primary reflector, said sections being ground and polished individually or in composite action. Each of the reflector bodies processed in this manner exhibits a support structure, e.g. a honeycomb structure. As material, quartz or quartz ceramics can be used. The reflector bodies prepared in this way are, herewith, preformed already that, with the grinding method, they need only be finished individually or in composite action. This means that the blanks of the individual reflector bodies already obtain, as a raw structure, their final shape prior to the grinding process, and have, then, only to be processed finally with respect to surface and shape by means of the grinding process. This grinding process can be performed individually or in a composite action. Using a, basically, closed full-circle surface as a reflector surface of the primary reflector, being itself formed of a plurality of polygonal reflector bodies, allows that outstanding results can be achieved for the point image as well as for the modulation transmission function. Furthermore, the arrangement of all support and adjustment elements below the reflector bodies effects that in the area of the effective closed reflector surface, no disturbing infrared sources are present, and, thus, no disturbing infrared radiation will be generated such that the primary reflector according to the invention exhibits the required infrared suitability, too.

The individual reflector bodies of the primary reflector made of preformed light-weight structures and having, substantially, hexagonal shape, or even polygonal shape, with a curved border, are ground and polished such that the degrees of freedom of the grinding and polishing tools of the off-axis section shape of a primary reflector to be prepared can be applied. This can be performed computer-controlled by means of polar coordinates, tool guidance being effected immediately. Thus, a primary reflector of large diameter can be prepared as a large astonomical reflector, the reflector bodies being immediately off-axis ground and end-polished and being joined together nearly free of gaps.

On the undersides of the reflector bodies, support and adjustment elements are disposed, to which belong, of course, inclination sensors, too. Thus, each reflector body can be controlled separately for adjustment to a common focus. This takes place in computer-controlled, manner as extremely fine tolerances must necessarily to be met. The optically ineffective separation between the individual reflector bodies are, thus, free from any disturbing thermal radiation and do not affect image quality. Thus, the primary reflector according to the invention is absolutely infrared-suitable and extremely sensitive. The diameter is extendable, theoretically, without limits.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

SUMMARY OF THE INVENTION

The invention relates to a primary reflector for a reflector telescope, comprising a plurality of individual polygonal reflector bodies 1 to 11 and supporting and adjusting elements 12 assigned to said reflector bodies.

It has been found out that a known primary reflector of this species has, on one hand, a poor point image and modulation transmission behaviour and is, on the other hand, not infrared-suitable, as the supporting and adjusting elements arranged in the area of the border lines between the individual polygonal reflector bodies 1 to 11, in particular the measuring sensors thereof, emit a disturbing heat radiation. Finally, the polygonal reflector bodies 1 to 11 of the known primary reflector 20 are expensive in manufacture.

For preventing these disadvantages, the invention provides that the reflector surface forms by extension reflector bodies 1 to 8 radially following the outer borders of the polygonal reflector bodies 9 a full-circle surface, that the reflector bodies 1 to 11 consist of reduced-weight, preformed material, and that the supporting and adjusting elements 12 are arranged below the reflector bodies 1 to 11. (FIG. 1).

BRIEF DESCRIPTION OF THE DRAWINGS

In the following, the invention is described in more detail based on an embodiment of a primary reflector for a reflector telescope represented in the drawing.

In the drawings.

DETAILED DESCRIPTION OF THE PREFERRED EMBODIMENT

Figure 1:
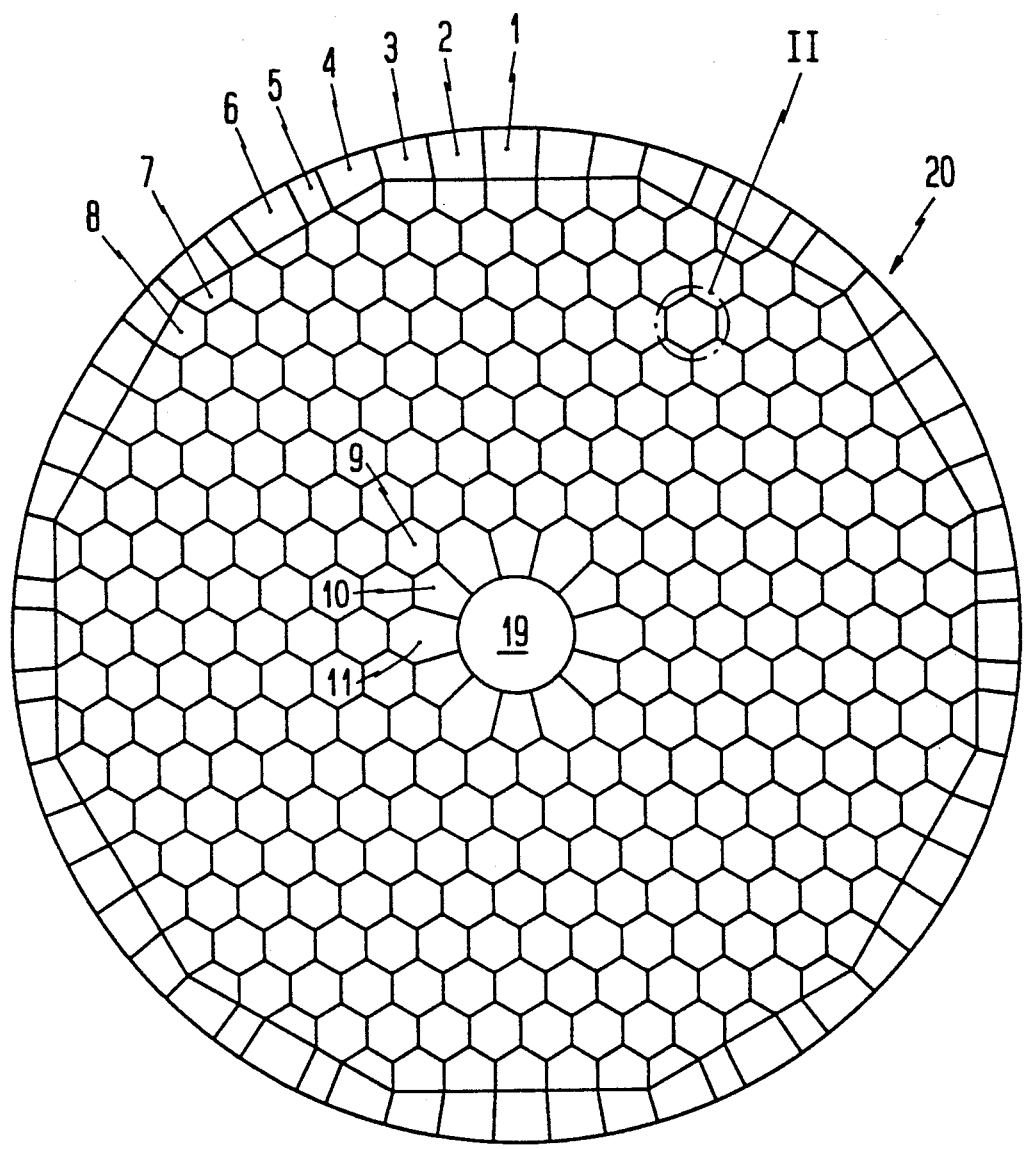
FIG. 1 is a top view of the primary reflector with central aperture.
Figure 2:
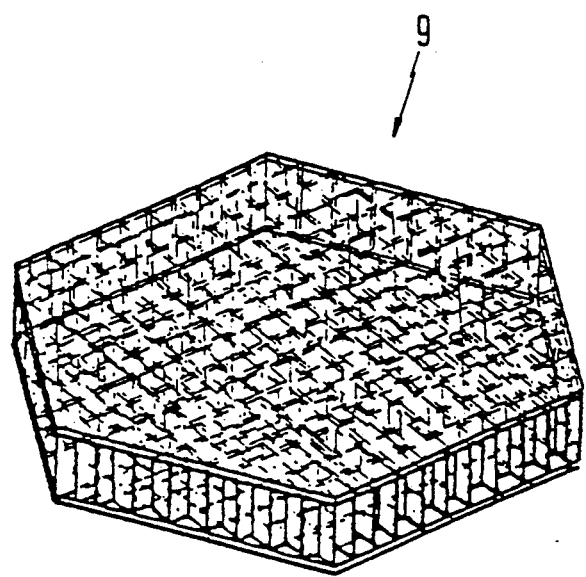
FIG. 2 is a perspective view of an individual hexagonal reflector body of the primary reflector, enlarged as compared to FIG. 1.

The primary reflector 20 for a reflector telescope shown in a top view in FIG. 1 consists of a plurality of individual, polygonal reflector bodies 1 to 11 and support and adjustment elements 12 assigned thereto. The outer border of the primary reflector 20 is formed of polygonal reflector bodies 1 to 6 having different shapes, the outer edges of which having the circular radius of the primary reflector 20. Towards the interior, further, irregularly shaped polygonal reflector bodies 7, 8 follow. The substantial surface of the primary reflector 20 is formed by a plurality of hexagonal reflector bodies 9. Towards the center of the primary reflector 20 formed by a circular aperture 19, again a number of differently shaped, polygonal reflector bodies 10, 11 are provided, the border of which directed inwards having the radius of the central aperture 19. In this way, the reflector surface of the primary reflector 20 is achieved by the plurality of individual, hexagonal reflector bodies 9 and by reflector bodies 1 to 8 joined radially to the outer borders of the hexagonal reflector bodies 9 to form a full-circle surface, in the center of the primary reflector 20 around its central aperture 19 further reflector bodies 10, 11 being provided at the inner borders of the hexagonal reflector bodies 9.

Each reflector body 10, 11 and in particular each hexagonal reflector body 9 consists of a performed, low-weight material having a honey-comb structure (DE patent 30 18 785). Materials are, in particular, quartz and quartz ceramics, allowing for a low-weight construction of the primary reflector. The individual reflector bodies 1 to 11 consist, because of the large total aperture width of the primary reflector 20, of low-weight materials and form off-axis sections of a primary reflector. These are already preformed such that they need only be finished over a subsequent grinding process. This means that the blank of each reflector body 1 to 11 obtains as raw structure already its final shape prior to the grinding process, and is, then, only processed finally with respect to surface and shape by means of the grinding process. This can be performed in a grinding process individually or in composition action. On the underside, each reflector body 1 to 11 is provided with boreholes 21, into which the individual support and adjustment elements 12 engage.

Figure 3:
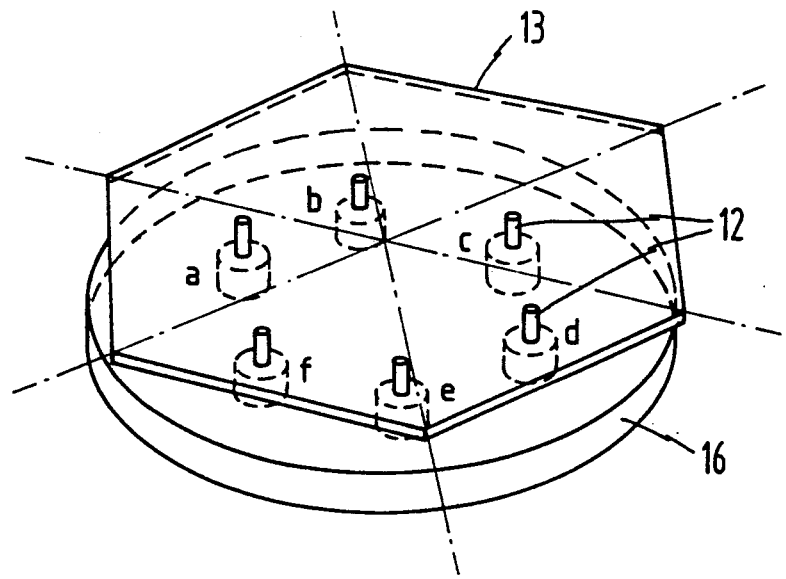
FIG. 3 is a schematic perspective view showing the support elements of a reflector body, and FIG. 4 a cross-sectional view taken, through the reflector body in the area of a support element.
Figure 4:
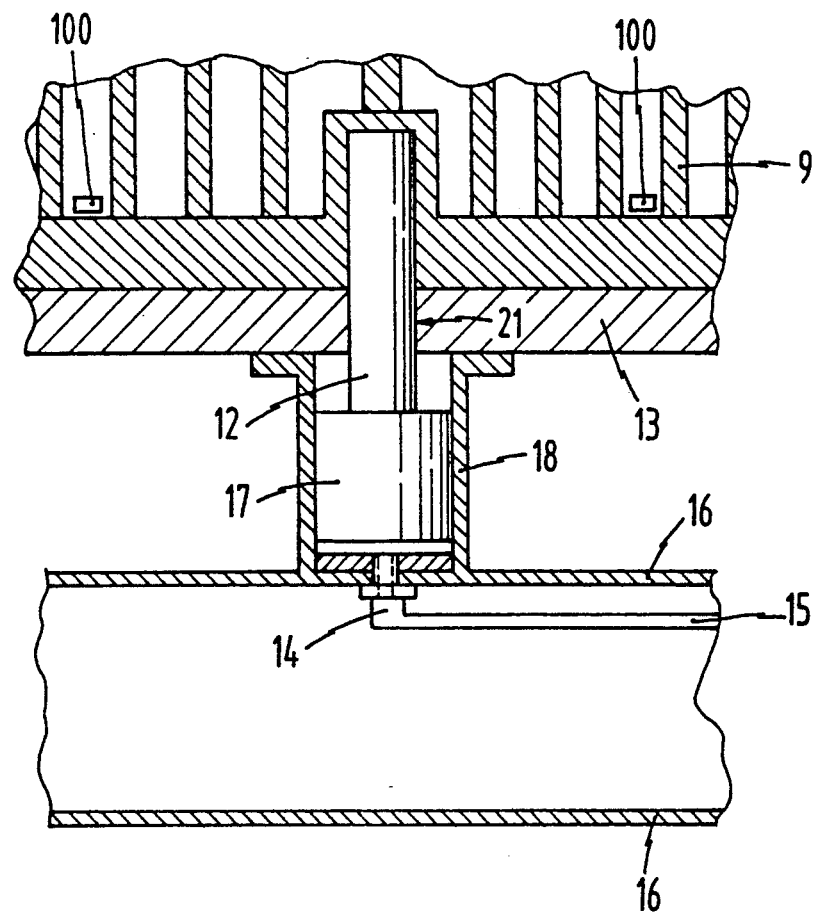

FIG. 3 shows the perspective arrangement of an individual hexagonal reflector support platform 13 having a total of six support and adjustment elements 12 on a support plate 16. As shown in FIG. 4, the individual support and adjustment elements 12 penetrate the boreholes 21 on the undersides of the individual reflector bodies 9, without, however, protruding over their reflector surface. The double-walled support plate 16 is provided with pressure-medium supplies 14, 15 connected to positioning and adjustment cylinders 18, in which support and adjustment pistons 17 are guided being connected in one-piece manner with the support and adjustment elements 12. In this way, the various reflector bodies 1 to 11 in the whole primary reflector 20 can be adjusted.

The support and adjustment elements of each reflector body 1 to 11 are, according to its geometrical shape, adjusted and arranged such that the thus supported reflector body 1 to 11 can be held for any position of the primary reflector by means of hydraulically controllable supports in a manner required therefor accurately on the focus of the primary reflector and can permanently be readjusted by means of computer-controlled fine-adjustment elements. This means that for different shapes of the polygonal outer border of the reflector bodies, the arrangement of the support and adjustment elements is selected differently under consideration of stability and weight of the respective reflector body.

In non-shown manner, a large low-weight reflector having a greater diameter and being ground symmetrically with respect to rotation can be arranged in the centre of the primary reflector, to said large reflector off-axis surface elements being joined without gaps, this leading to a full circular surface. The off-axis surface elements are, then, arranged separately in controllable and adjustable fashion, such that they form the circular and, thus, optically effective primary reflector.

In a manner not shown in detail (see FIG. 4), displacement sensors 100 are located, further, directly in the individual hollow spaces of the reflector bodies consisting of a honey-comb structure, in particular made of quartz glass, whereby no disadvantages for the infrared suitability of the primary reflector will occur. Such a reflector body of quartz glass in low-weight construction is known from an information brochure of the Scientific Astronomical Meeting in Munich from 14 to 18 Sep. 1987. Therein, the cover plate of a reflector body is pre-bent by so-called slumping into the desired geometrical shape, and is, then, connected over a structure of quartz glass to a base plate, e.g. by welding. Finally, grinding and polishing of the surfaces of the reflector body to the final shape is performed. This can be effected by single grinding or composite grinding of several reflector bodies of identical surface shape, said reflector bodies being, then, processed commonly.

I claim:

1. A primary reflector for a reflector telescope, comprising: a plurality of individual polygonal reflector bodies, a first group of said plurality of individual reflector bodies having edge surface cooperating to form a full circular surface formed by radially joined edges providing an outer border of a cooperating plurality of reflector bodies and a second group of said plurality of individual reflector bodies having edge surfaces cooperating to form a full circular surface formed by radially joined edges providing an inner border, each of said reflector bodies being formed of quartz or glass ceramic providing a honey-comb structure defining a plurality of hollow spaces for reducing the weight of individual reflector bodies, each individual reflector body being formed from a reflector body blank having the shape and surface substantially corresponding to the final shape and surface of the reflector body, each reflector body blank being individually ground and polished for final processing at the reflector surface, positioning and adjusting means, including individual positioning and adjusting elements assigned to each reflector body, said elements being positioned below the reflector bodies; and sensor means for measuring the relative position of each individual reflector body, said sensor means being mounted in the selected hollow spaces of said honey-comb structure of each of said individual polygonal reflector bodies.

* * * * *

UNITED STATES PATENT AND TRADEMARK OFFICE
CERTIFICATE OF CORRECTION

PATENT NO. : 5,157,556
DATED : October 20, 1992
INVENTOR(S) : Hermann Hügenell It is certified that error appears in the above-identified patent and that said Letters Patent is hereby corrected as shown below:

On the title page of the Patent, please correct the Inventor data as follows:

[75] Inventor: Hermann Hügenell, Lambsheim, Fed. Rep. of Germany column 5, line 11 of the specification to read as follows:

Column 5  line 11  replace "quartz and quartz ceramics"

with --quartz and glass ceramic--.

Signed and Sealed this

Twenty-eighth Day of December, 1993

Attest:

BRUCE LEHMAN

*Attesting Officer*   *Commissioner of Patents and Trademarks*